Aug. 15, 1939.  W. F. REGENHARDT  2,169,769
CABINET CONSTRUCTION
Filed July 5, 1938

INVENTOR
Walter F. Regenhardt
BY
Warren H. F. Schmidt
ATTORNEY

Patented Aug. 15, 1939

2,169,769

UNITED STATES PATENT OFFICE 2,169,769

CABINET CONSTRUCTION

Walter F. Regenhardt, Cleveland, Ohio

Application July 5, 1938, Serial No. 217,368

8 Claims. (Cl. 312—111)

This invention relates to improvements in cabinets, and more particularly to means for attaching a plurality of individual casings together, to form a composite filing cabinet.

An object of this invention is to provide a cabinet formed of a plurality of casings, one superimposed upon another, each casing having interlocking means adjacent one end thereof which may be interlocked by sliding one casing relative to the other for attaching one casing to the other, and having means at the opposite ends of the casings for preventing sliding of the casings and unlocking of the interlocking means when they are thus attached.

A further object of the invention is to provide a cabinet as described in the preceding paragraph in which the casings are formed with top and bottom wall members having shoulders formed adjacent one end thereof so that a shoulder on the bottom wall member may be interlocked with the shoulder on the top wall member of an adjoining casing by sliding one of the casings relative to the other, and having boss means formed on one of the walls of the casings for engaging in a recess formed in the wall of the adjoining casing when the shoulders are interlocked to prevent sliding of the casings relative to one another and unlocking of the shoulders.

Another object of the invention is to provide a cabinet comprising a plurality of casings each having a top and bottom wall and a sliding drawer therein, the bottom wall of the casings being formed with a pair of raised portions for receiving a pair of bosses formed on the top wall of a lower adjacent casing to prevent sliding of the casings relative to one another, the raised portions also serving as supports for the sliding drawer.

Other and further objects and advantages will be apparent from the following description, reference being had to the accompanying drawing wherein a preferred form of embodiment of the present invention is clearly shown.

Figure 1:
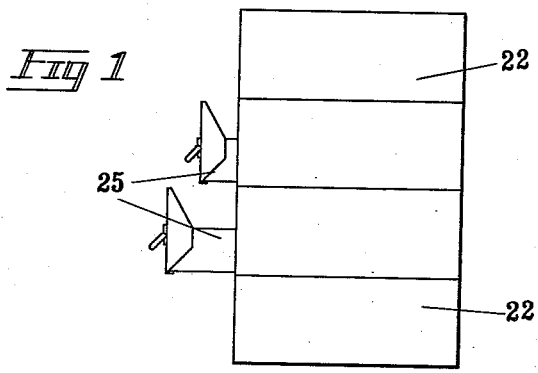
Fig. 1 is a side view of a filing cabinet formed of a plurality of casings and showing two drawers of the cabinet partially open.

A filing cabinet embodying my invention is shown generally at 20. The cabinet comprises a plurality of individual casings 22, one superimposed on another. The casings are preferably formed of sheet metal and having side walls 24, a rear wall 26, a top wall 28 and a bottom wall 30. These walls may be joined together to form the casing by any suitable method, such as for example, welding. The casings 22 are open at one end as at 21 and a rectangular frame formed of a band of metal 23 is disposed around the inside of the opening 21 and welded to the walls to provide reenforcement for the casing. This form of construction is disclosed and claimed in my Patent Number 2,123,803.

Figure 2:
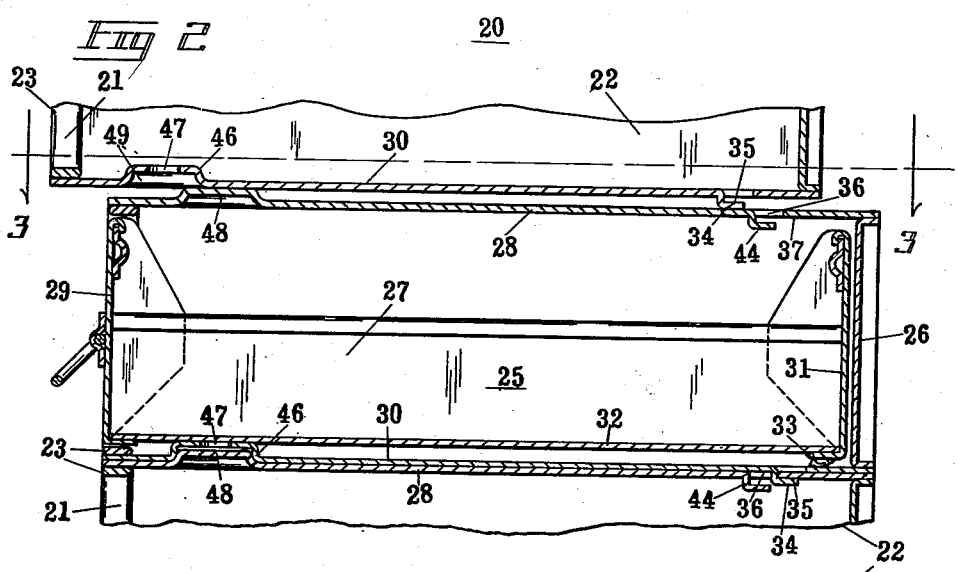
Fig. 2 is a fragmentary view taken on line 2—2 of Fig. 3 showing a casing superimposed on and interlocked with a second casing, and a third casing superimposed upon but not yet interlocked with the first casing; the first casing being shown with a drawer inserted therein; and, Fig. 3 is a view taken on line 3—3 of Fig. 2, a rear portion of a drawer being shown in dotted lines.
Figure 3:
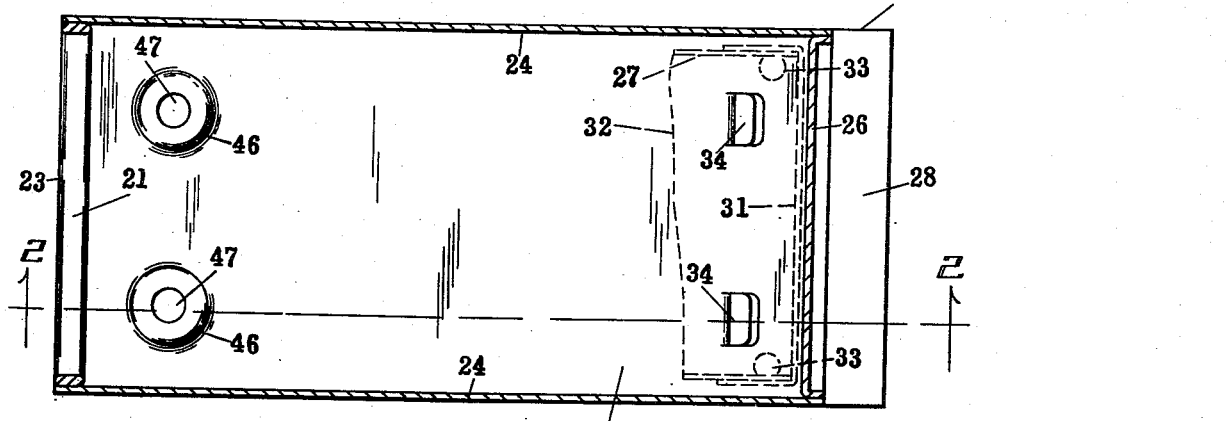

A drawer 25 is adapted to be slidably inserted in each of the casings 22. The drawer 25 is preferably formed of sheet metal and having side walls 27, a front wall 29, a rear wall 31, and a bottom wall 32. These walls may be suitably joined as by welding to form the drawer. A pair of lugs 33 (one being shown in Fig. 2) are formed in the bottom wall 32 of the drawer 25 adjacent the rear and sides thereof. These lugs 33 serve as gliders on which the rear part of the drawer is supported. The lugs 33, rear wall 31 and the reenforcing band 23 cooperate to form a stop means for the drawer, as is more fully set forth and claimed in my patent mentioned above.

For convenience and flexibility in use it is often desirable to add more casings to a cabinet or remove some casings as the circumstances of the user may require. It is desirable therefore that the casings may be readily attached to one another so that there can be no tipping or sliding of the casings when the drawers 25, which are often heavy with papers and the like, are drawn outwardly from the casings. My invention provides means for readily attaching one casing to another so that tipping or sliding of the casings is impossible. In carrying out my invention, a pair of tongues 34 are formed on the bottom wall 30 of each casing, and are adapted to be inserted in openings 36 formed in the top wall 28 of the casings 22 and engage the inside of the top wall 28 at 37. The tongues 34 are cut out of the metal bottom wall 30 and are formed with a reverse curve so that a surface 35 thereof extends parallel to the wall 30 and is spaced from the wall substantially the thickness of the top wall 28. The openings 36 are formed in the top wall 28 of the casings 22 by cutting tongue-like members 44 in the top wall and forming a reverse curve in the members 44 so that the members 44 will extend inside the casing and serve to shield the interior of the casing from dust and dirt when the openings 36 are not covered by a casing. The tongues 34 and the openings 36 are one form of means for providing interlocking shoulders on each casing, the tongues 34 on the wall 30 serving as shoulders on one casing and the part 37 of the wall 28, adjacent the openings 36, serving as shoulders on a second casing, one set of shoulders being adapted to interlock with the other. The tongues 34 and openings 36 are located on their respective wall members with respect to the rear wall 26 so that when the tongues 34 are interlocked with the wall 28, the casings thus connected will be in alignment.

A pair of circular bosses 46 are formed in the bottom wall 30 of the casings 22 and extend upwardly into the casings. These bosses 46 are formed by pressing the metal wall 30 inwardly with a suitable die so that a pair of recesses 49 will also be formed in the bottom wall 30. Preferably openings 47 are made in the wall 30 so that the metal will more readily stretch when the bosses 46 are formed. One purpose of the bosses 46 is to provide bearing surfaces for supporting the bottom wall of the drawer 25. Thus when the drawer 25 is inserted in the casing 22 the bottom wall 32 thereof will rest on the bosses 46 and clear the band 23 to prevent binding or catching of the drawer on the band. As stated above the lugs 33 are formed on the bottom wall adjacent the side edges of the drawer 25 so that the lugs 33 will move on the outside of the tongues 34 and the bosses 46 when the drawer is withdrawn or inserted in the casing. Thus the drawer is entirely supported on the bosses 46 and lugs 33 which present a relatively small friction surface so the drawer will be easily slid in the casing. A pair of circular bosses 48 are formed in the top wall 28 of the casings 22 and protrude upwardly. These bosses 48 are adapted to nest in the recesses 49 when the tongues 34 are interlocked with the part 37 of the wall 28, to prevent the casing from sliding forward when the drawer 25 is withdrawn, and also properly align the casings with respect to one another.

When it is desirable to form a cabinet of two or more of the casings 22, one casing is superimposed on the other with the tongues 34 inserted in the openings 36. The uppermost casing is then slid rearwardly so that the surface 35 of the tongues 34, engage the part 37 of the top wall 28 of the next lower casing. Thus the tongues 34 are interlocked with a part 37 of the wall 28. The bosses 48 will then rest in the recesses 49 and prevent sliding of the uppermost casing and accidental unlocking of the tongues 34 with the wall 28. It is apparent that the tongues 34 interlocking with part of the wall 28 prevent the rear of the uppermost casing from being raised or tilted upwardly, and the bosses 48 prevent accidental sliding of the uppermost casing that might disengage the tongues 34. When it is desirable to detach the upper casing from a composite cabinet thus formed, the front part of the uppermost casing is raised to disengage the bosses 48 from the recesses 49. The uppermost casing is then slid forwardly so that the tongues 34 will be removed from the openings 36.

Thus I have provided means for readily attaching superimposed casings to one another to form a composite cabinet which may be easily manufactured and simple in operation.

While the form of embodiment of the present invention as herein disclosed constitutes a preferred form, it is to be understood that other forms might be adopted, all coming within the scope of the claims which follow:

I claim:

1. In a cabinet comprising a plurality of casings, one superimposed on another; one of said casings having a bottom wall; a recessed part formed in the wall; a drawer slidably supported in said casings; a second casing having a top wall; and a projecting part formed on the said top wall for engaging in the said recessed part, one of said parts serving as a support for said drawer.

2. In a cabinet comprising a plurality of casings, one superimposed on another; one of said casings having a bottom wall; a pair of recessed parts formed in the wall and protruding inside the casing; a second casing having a pair of protruding parts for engaging in said recessed parts; and a drawer slidably supported inside the said one casing, said drawer being supported adjacent one end thereof by said recessed parts.

3. A cabinet comprising a plurality of casings, one superimposed on another; means forming a shoulder adjacent the rear and top of one of the casings, said shoulder having a leading edge facing the front of the casing, means forming a shoulder adjacent the rear and bottom of another casing, the second mentioned shoulder having a leading edge facing the rear of the casing, one of said shoulders being disposed to be moved under the leading edge of the other shoulder when the second mentioned casing is placed on the first mentioned casing and slid rearwardly whereby the shoulders are brought into engageable position with one another; and interlockable means disposed adjacent the front of the casings for preventing sliding movement of the casings with respect to one another after the shoulders are slid into engageable position.

4. A cabinet comprising a plurality of casings, one superimposed on another, one of said casings having a bottom wall, another of said casings having a top wall; means forming a shoulder on the top wall having a leading edge facing toward the front of the cabinet; means forming a shoulder on the bottom wall having a leading edge facing toward the rear of the cabinet, the leading edge of one of said shoulders being disposed to move under the leading edge of the other when the first mentioned casing is placed on the second mentioned casing and slid rearwardly whereby the shoulders are brought into engageable position with one another; and interlockable means disposed adjacent the front of the casings for preventing sliding movement of the casing with respect to one another after the shoulders are slid into engageable position.

5. A cabinet comprising a plurality of casings, one superimposed on another, one of said casings having a bottom wall and another of said casings having a top wall; means forming a shoulder on the top wall substantially forwardly of the rear edge of the wall and having a leading edge facing toward the front of the cabinet; means forming a shoulder on the bottom wall substantially forwardly of the rear edge of the wall and having a leading edge toward the rear of the cabinet, the leading edge of one of said shoulders being disposed to move under the leading edge of the other shoulder when the first mentioned casing is placed on the second mentioned casing and slid rearwardly whereby the shoulders are brought into engageable position with one another; and interlockable means disposed adjacent the front of the casings for preventing sliding movement of the casings with respect to one another after the shoulders are slid into engageable position.

6. A cabinet comprising a plurality of casings, one superimposed on another, one of said casings having a sheet metal bottom wall and another casing having a sheet metal top wall; a tongue on one of said walls, the other of said walls having an opening for receiving the tongue when the upper of said casings is slid rearwardly into position, said tongue being arranged to engage the inner surface of the wall having the opening when the upper casing is lifted after said upper case is in position; and interlockable means disposed adjacent the front of the casings for preventing sliding movement of the casings with respect to one another after the tongue is received in the opening.

7. A cabinet comprising a plurality of casings, one superimposed on another, one of said casings having a sheet metal bottom wall and another casing having a sheet metal top wall, a tongue on one of said walls, the other of said walls having an opening for receiving the tongue when the upper of said casings is slid rearwardly into position, said tongue being arranged to engage the inner surface of the wall having the opening when the upper casing is lifted after said upper case is in position, said tongue having a width substantially equal to the width of the opening whereby the side edges of the tongue will engage the side walls of the opening and thereby prevent sidewise movement of the upper casing; and interlockable means disposed adjacent the front of the casings for preventing sliding movement of the casings with respect to one another after the tongue is received in the opening.

8. A cabinet comprising a plurality of casings, one superimposed on another, one of said casings having a sheet metal bottom wall and another casing having a sheet metal top wall; a tongue comprising a portion of one of the walls formed to extend from the surface of the wall and substantially parallel thereto, the other of said walls having an opening for receiving the tongue when the upper of said casings is slid rearwardly into position, said tongue being arranged to engage the inner surface of the wall having the opening when the upper casing is lifted after said upper casing is in position; and interlockable means disposed adjacent the front of the casing for preventing sliding movement of the casings with respect to one another after the tongue is received in the opening.

WALTER F. REGENHARDT.